(12) United States Patent
Drever

(10) Patent No.: US 10,906,489 B2
(45) Date of Patent: Feb. 2, 2021

(54) QUICK RELEASE GRILL GUARD AND ASSOCIATED SYSTEMS AND METHODS

(71) Applicant: Holt Sales & Service, Inc., Des Moines, IA (US)

(72) Inventor: Jeremy Drever, Ankeny, IA (US)

(73) Assignee: Holt Sales & Service, Inc., Des Moines, IA (US)

( * ) Notice: Subject to any disclaimer, the term of this patent is extended or adjusted under 35 U.S.C. 154(b) by 69 days.

(21) Appl. No.: 16/166,326

(22) Filed: Oct. 22, 2018

(65) Prior Publication Data

US 2019/0054878 A1 Feb. 21, 2019

Related U.S. Application Data

(63) Continuation of application No. 15/419,377, filed on Jan. 30, 2017, now Pat. No. 10,106,114, which is a continuation of application No. 14/825,344, filed on Aug. 13, 2015, now Pat. No. 9,555,757, which is a continuation of application No. 14/249,974, filed on Apr. 10, 2014, now Pat. No. 9,114,771.

(60) Provisional application No. 61/810,598, filed on Apr. 10, 2013.

(51) Int. Cl.
| | |
|---|---|
| *B60R 19/52* | (2006.01) |
| *E05C 3/12* | (2006.01) |
| *E05C 3/14* | (2006.01) |
| *E05C 9/08* | (2006.01) |
| *E05D 11/10* | (2006.01) |

(52) U.S. Cl.
CPC ............... *B60R 19/52* (2013.01); *E05C 3/12* (2013.01); *E05C 3/14* (2013.01); *E05C 9/08* (2013.01); *E05D 11/1007* (2013.01); *B60R 2019/522* (2013.01); *E05Y 2900/50* (2013.01); *Y10T 292/082* (2015.04)

(58) Field of Classification Search
CPC ..... B60R 19/52; B60R 2019/522; E05C 3/12; E05C 3/14; E05C 9/08; E05D 11/1007; Y10T 292/082
See application file for complete search history.

(56) References Cited

U.S. PATENT DOCUMENTS

| | | |
|---|---|---|
| D148,758 S | 3/1947 | Bustin |
| 2,880,016 A | 3/1959 | Peterson |
| 3,282,368 A | 11/1966 | Frederick |
| 4,125,214 A | 11/1978 | Penn |
| 4,273,352 A | 6/1981 | Jorgenson |
| 5,067,760 A | 11/1991 | Moore et al. |
| 7,261,346 B1 | 8/2007 | Kubesh |

(Continued)

*Primary Examiner* — Lori L Lyjak
(74) *Attorney, Agent, or Firm* — Davis, Brown, Koehn, Shors & Roberts, P.C.; Matthew Warner-Blankenship

(57) ABSTRACT

The disclosed apparatus, systems and methods relate to a quick release grill guard further comprising at least one latching system configured for the quick release and pivot of the grill guard away from the vehicle grill face. In certain embodiments, the quick release grill guard further comprises a grill guard coupling portion, a vehicle coupling portion, a latching portion a hinge, a quick release bar; and a clasping member. In certain embodiments, the grill guard coupling portion is capable of being freely pivoted relative to the hinge by actuation of the clasping member by way of the quick release bar. In exemplary embodiments, the quick release bar is in operable communication with multiple latching systems so as to release the grill guard in a plurality of locations simultaneously.

17 Claims, 19 Drawing Sheets

(56) References Cited

U.S. PATENT DOCUMENTS

2007/0252396 A1   11/2007  Kang
2009/0079209 A1    3/2009  Hastings
2009/0212581 A1    8/2009  Dreyer

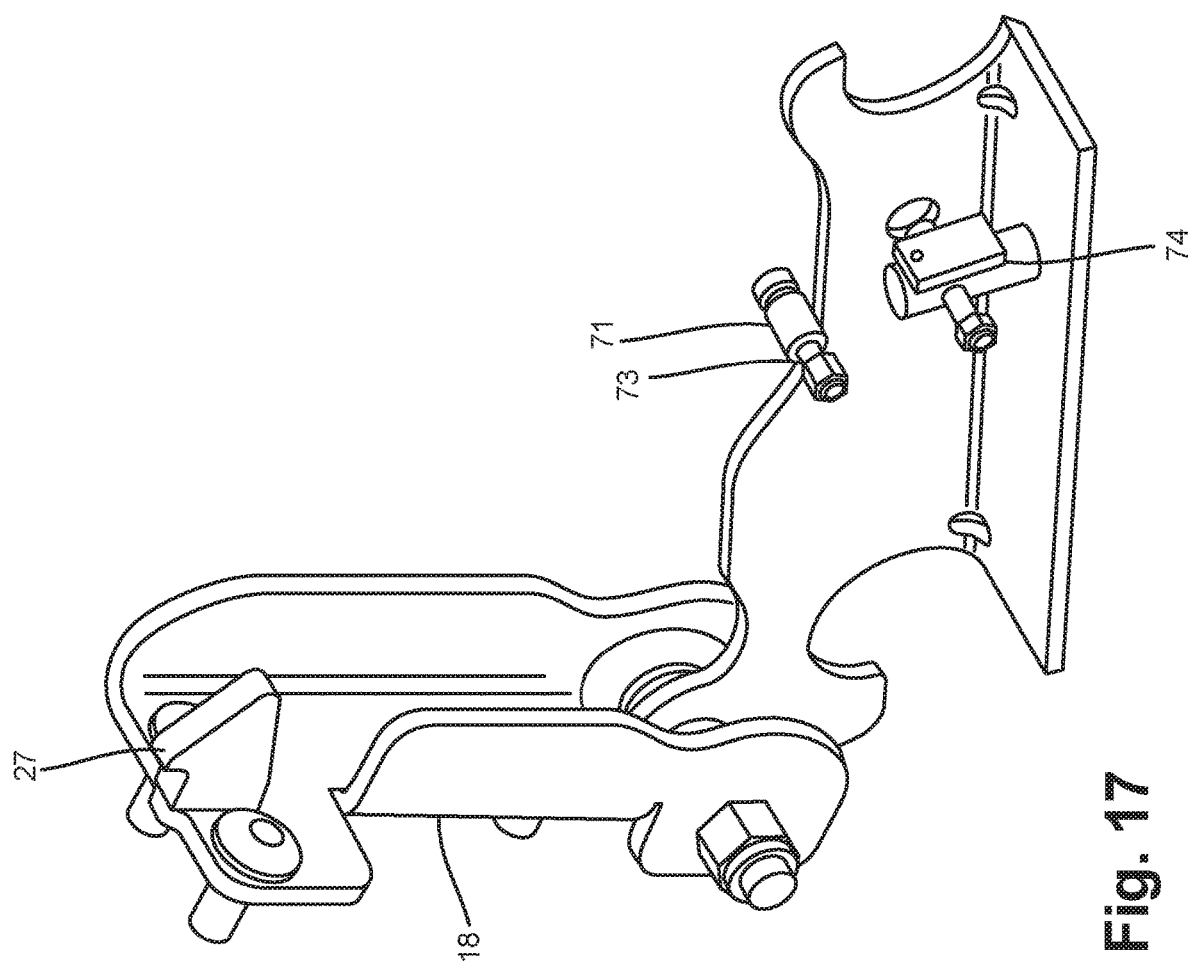

QUICK RELEASE GRILL GUARD AND ASSOCIATED SYSTEMS AND METHODS

CROSS-REFERENCE TO RELATED APPLICATION(S)

This application is a continuation of, and claims priority to U.S. patent application Ser. No. 15/419,377 filed Jan. 30, 2017, and entitled "Quick Release Grill Guard And Associated Systems And Methods," which is issuing on Oct. 23, 2018, which is a continuation of U.S. patent application Ser. No. 14/825,344 filed Aug. 13, 2015, and entitled "Quick Release Grill Guard," which is issuing on Jan. 31, 2017 as U.S. Pat. Nos. 9,555,757; 9,114,771 entitled "Quick Release Grill Guard;" and U.S. Provisional Application 61/810,598, entitled "Grill Guard," filed Apr. 10, 2013 all of which are hereby incorporated herein by reference in their entirety under 35 U.S.C. § 119(e).

TECHNICAL FIELD

The disclosure relates to devices, systems and methods for protecting the grills of semis, tractor trailers, trucks and other vehicles. More specifically, the device and method of using is an adjustable grill guard which is capable of quick release so as to be easily rotated away from the protected grill.

BACKGROUND

Trucks, such as semi trucks and tractor trailers are ubiquitous on the roads at all hours of day and night, and are integral to the world's over-the-road transportation and hauling of goods. These trucks (which include, but are not limited to semis and tractor trailers) are quite expensive, and require significant investment.

Such trucks typically are fitted with a grill at the front to allow for air intake and engine cooling. In many implementations, these grills have aesthetic properties as well as functional ones. However, with the number of deer and other hazards that are present on the roads, collisions that damage these grills can lead to significant repair costs. Considering the continual increase in the price of fuel and other aspects of modern globalization, it is crucial for companies employing such methods of transport to keep their overall costs low. As such, there is a need in the art for a relatively inexpensive and effective way to protect these grills.

BRIEF SUMMARY

In Example 1, a quick release grill guard, comprising a grill guard assembly; and a latching system, further comprising a grill guard coupling portion; a vehicle coupling portion; a latching portion; a hinge; and a release member, wherein the grill guard coupling portion is capable of being freely pivoted relative to the hinge by actuation of the latching portion by way of the release member.

In Example 2, a quick release grill guard is provided, comprising a grill guard assembly and at least one latching system, further comprising a grill guard coupling portion, a vehicle coupling portion, a clasped member, a hinge, and a clasping member, and a quick release bar, wherein the grill guard coupling portion is capable of being freely pivoted relative to the hinge by actuation of the clasping member by way of the quick release bar.

While multiple embodiments are disclosed, still other embodiments of the grill guard will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 17 is a reverse perspective view of the latching system of FIG. 16.

DETAILED DESCRIPTION

Exemplary embodiments of the disclosed apparatus, systems and methods are herein described with references to the accompanying illustrations. It is to be understood that other embodiments may be utilized and structural and functional changes may be made without departing from the respective scope of the invention. As such, the instant description is presented by way of illustration only and should not limit in any way the various alternatives and modifications that may be made to the illustrated embodiments and still be within the spirit and scope of the invention.

As discussed herein, it is a principle object of the disclosed apparatus, systems and methods (collectively, the "grill guard") to provide a protective covering for the grill of a semi, tractor trailer, truck or other automobile ("vehicle") which is easy to pivot away from the vehicle. While references are made to the grill guard and vehicle throughout, this designation is made for brevity and in no way to reduce the scope of the various embodiments of the instant disclosure.

Exemplary embodiments of the quick release grill guard comprise a grill guard assembly and a bracket. The grill guard assembly further comprises a latching system which is configured to allow the easy adjustment of the grill guard in "open" and "closed" positions about a hinge.

Figure 1:
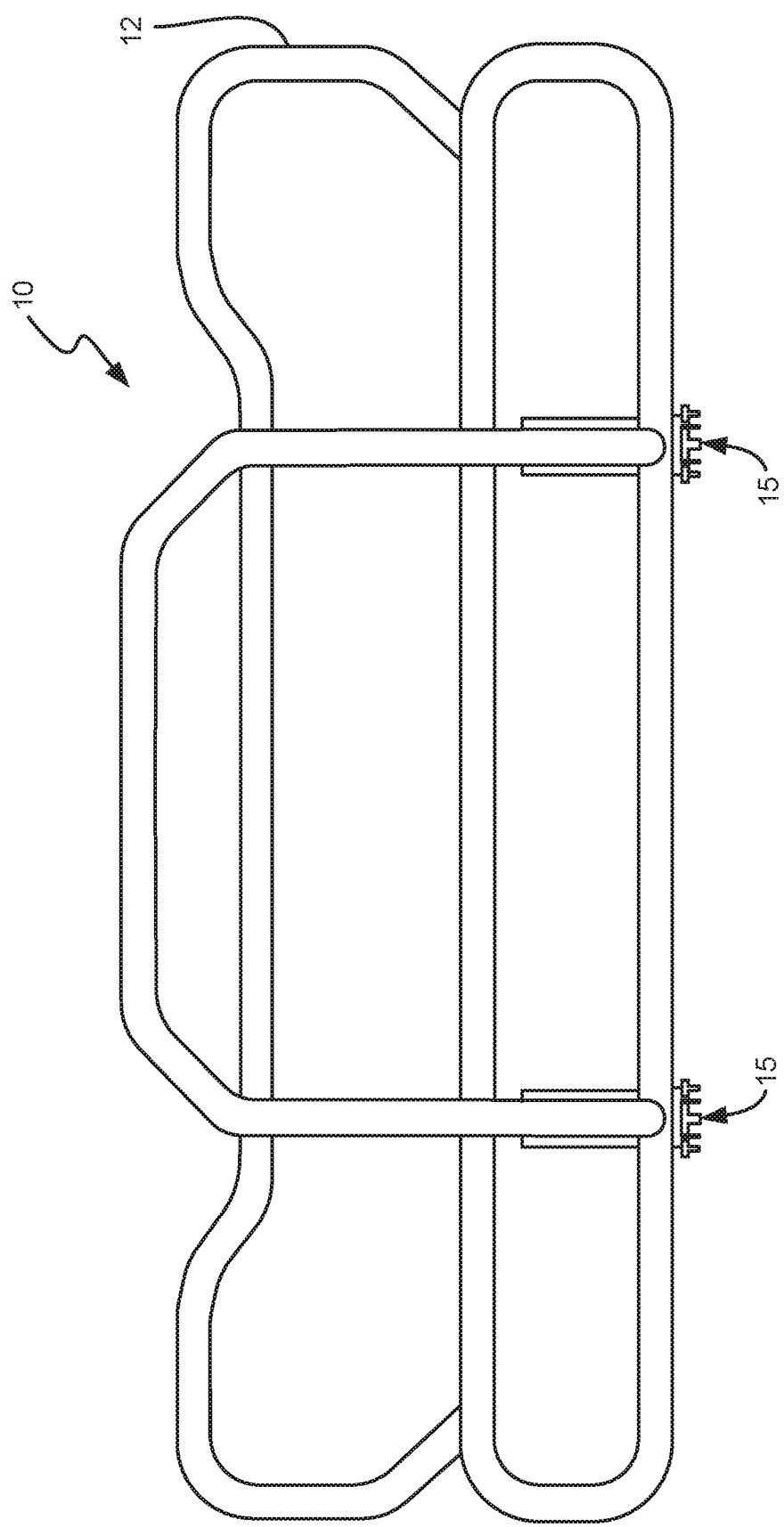
FIG. 1 is a front view of an exemplary embodiment of the quick release grill guard.

Various exemplary embodiments of a quick release grill guard 10 are depicted in FIGS. 1-19. As is shown in FIG. 1, exemplary embodiments of the quick release grill guard 10 adapted to be coupled to the front end of a motor vehicle. Exemplary embodiments of the quick release grill guard 10 comprise a grill guard assembly 12 and at least one latching system 15. As is depicted in FIGS. 1-5, the latching system 15 can encompass a variety of sizes and shapes of grill guard assemblies 12, including both double-looped (shown at 12A in FIG. 2) and single-looped (shown at 12B in FIG. 3) guard configurations, which are among several grill guard configurations which are well-established in the art.

Figure 2:
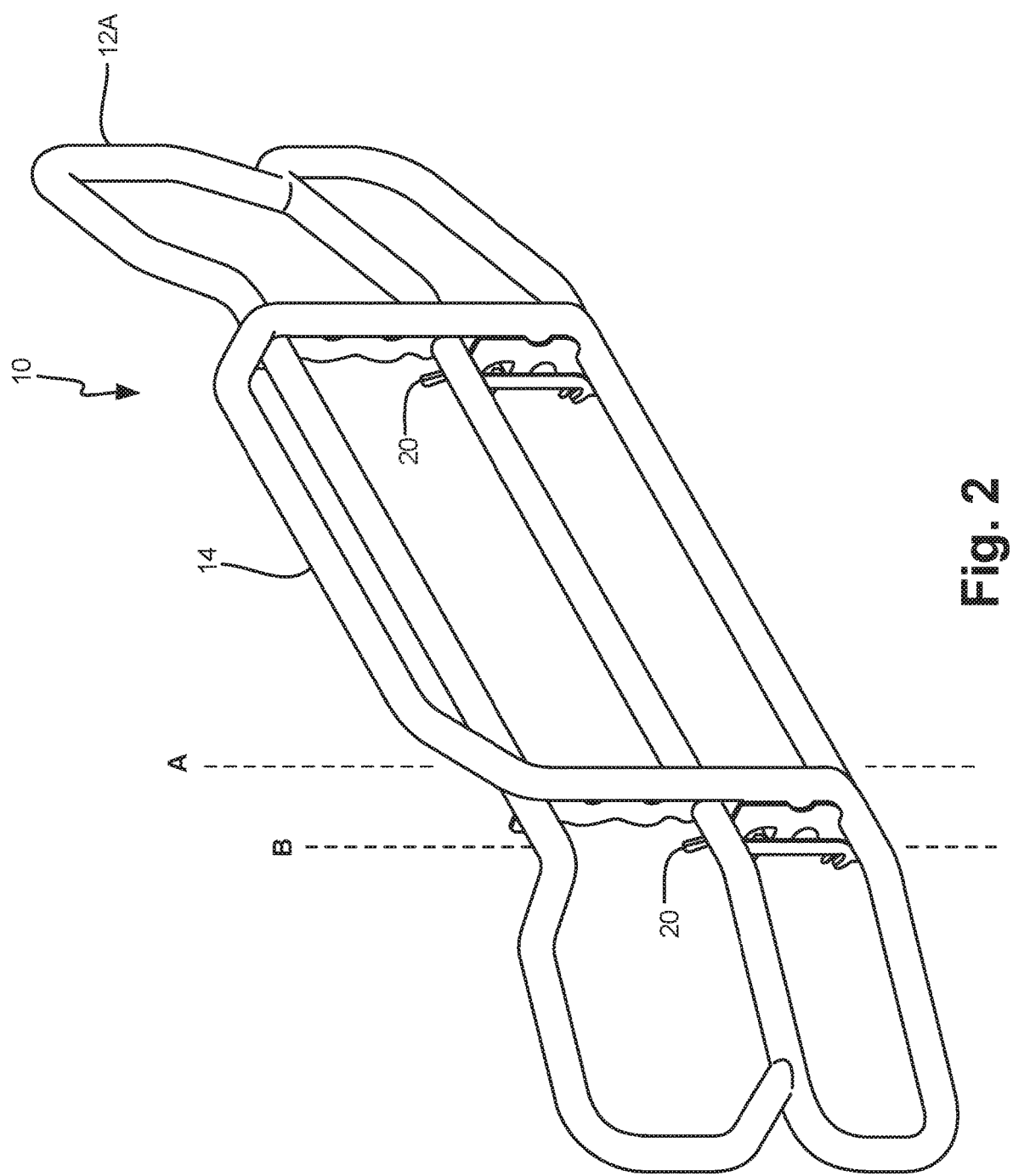
FIG. 2 is a perspective view of the quick release grill guard, according to an exemplary embodiment having a double-looped grill.
Figure 3:
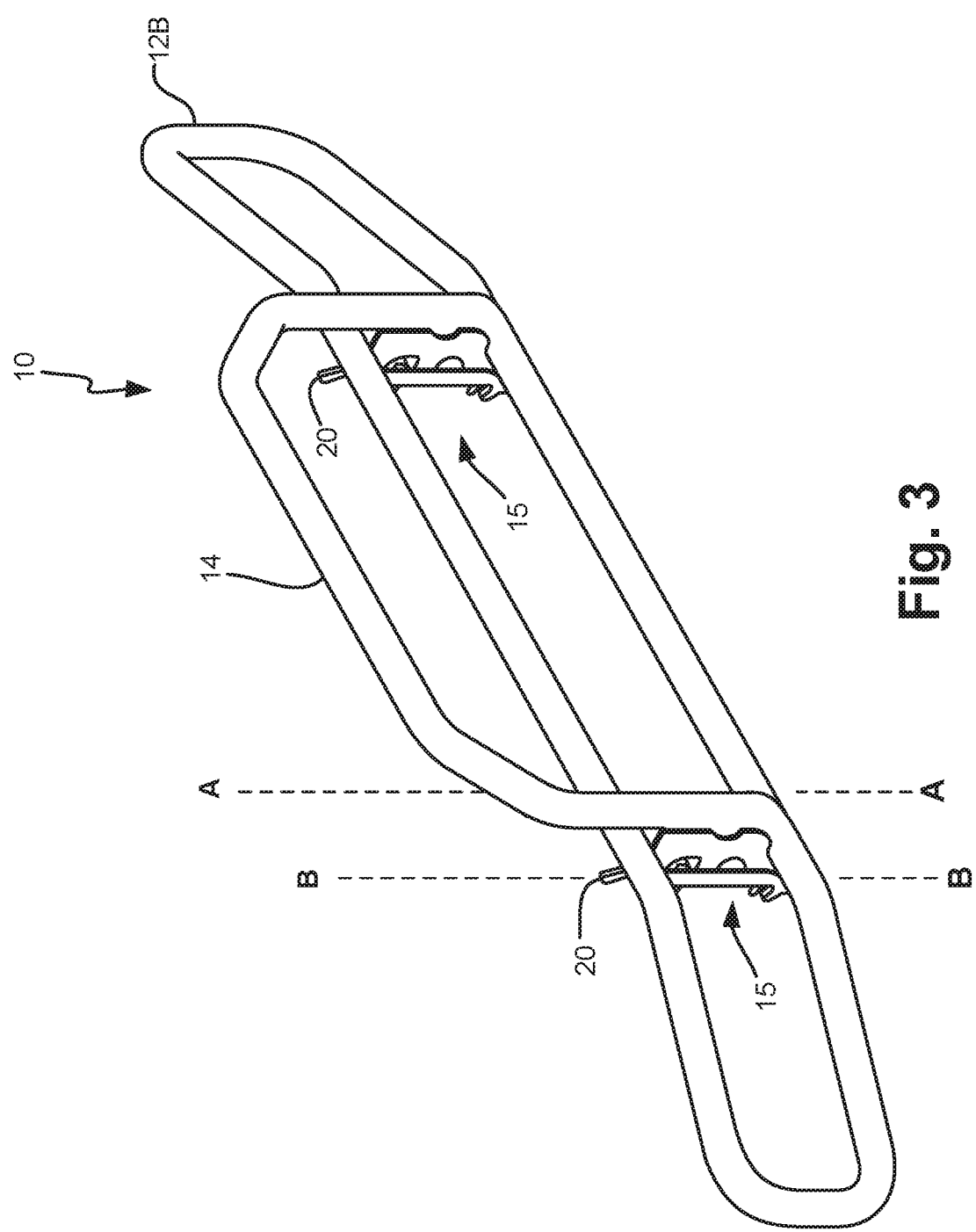
FIG. 3 is a perspective view of the quick release grill guard, according to an exemplary embodiment having a single-looped grill.
Figure 4:
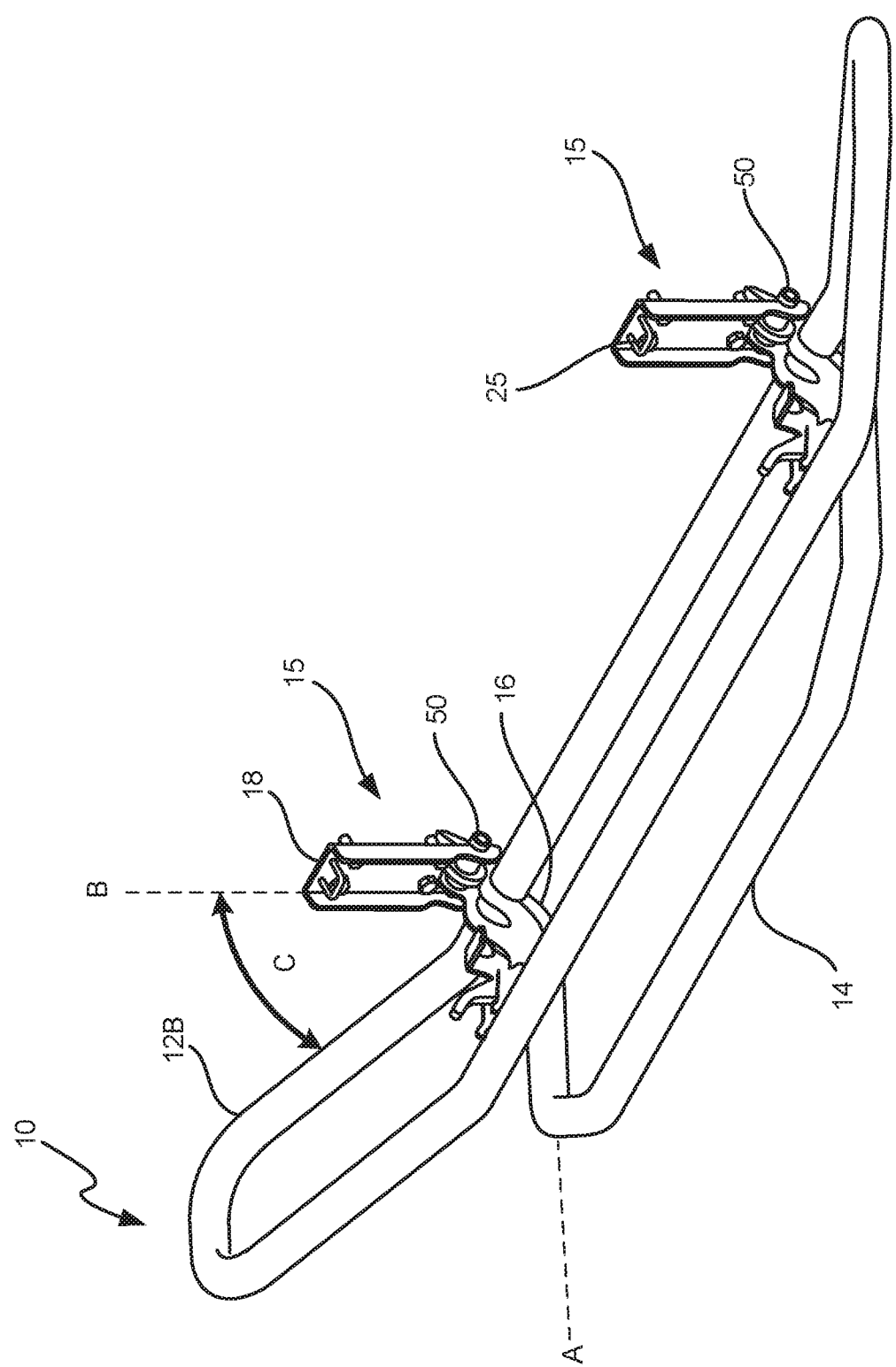
FIG. 4 is a perspective view of the quick release grill guard, according to the embodiment of FIG. 3 in the open position.

As is depicted in FIGS. 2-5, the quick release grill guard 10 is configured so as to facilitate rotation of the grill guard assembly 12 between positions. That is, in exemplary embodiments of the system 10, under normal operating conditions the grill guard assembly 12 is normally in a first position (as is shown in FIGS. 2-3), wherein the axis of the grill guard (designated by the line at A) is substantially parallel or otherwise aligned with the grill (designated by the line at B) of a vehicle such as a semi (not shown). However, the system 10 is configured such that when it is desired, the latching systems 15 may be operated so as to reposition the axis of the grill guard A away from the axis of the grill B. As is further depicted in FIGS. 4-5, a latching system 15 can further comprise a hinge 50 which facilitates the controlled rotation of the grill guard assembly 12 away from the grill face B (the grill guard coupling portion 16 relative to the vehicle coupling portion 18). In various implementations, this means that the uppermost portion 14 of the grill guard assembly can be rotated relative to the hinge 50 (as is described further in relation to FIGS. 6-7).

In various implementations, the uppermost portion 14—and therefore the axis of the grill guard assembly A—is moved/rotated into a second position wherein the axis is set at a substantially non-parallel angle to the grill face B. In certain embodiments, this may be an acute, perpendicular, or obtuse angle. An exemplary embodiment showing an acute angled second position is depicted by the reference arrows C and D in FIGS. 4-5, respectively.

The quick release grill guard 10 comprises at least one latching system 15, certain exemplary embodiments of which are shown in FIGS. 6-7 and 10-11. In various embodiments, the latching system 15 can further comprise a grill guard coupling portion 16 further comprising a release member 20 and grill coupling region 55, and a vehicle coupling portion 18 further comprising a catch 25, a bracket 30 and at least one fastener 40 for attaching the bracket 30 to the frame, bumper, or other fixed portion of the vehicle (not shown). In certain embodiments, the grill is coupled to the grill coupling region 55 by welding or some other means well-established in the art.

Figure 6:
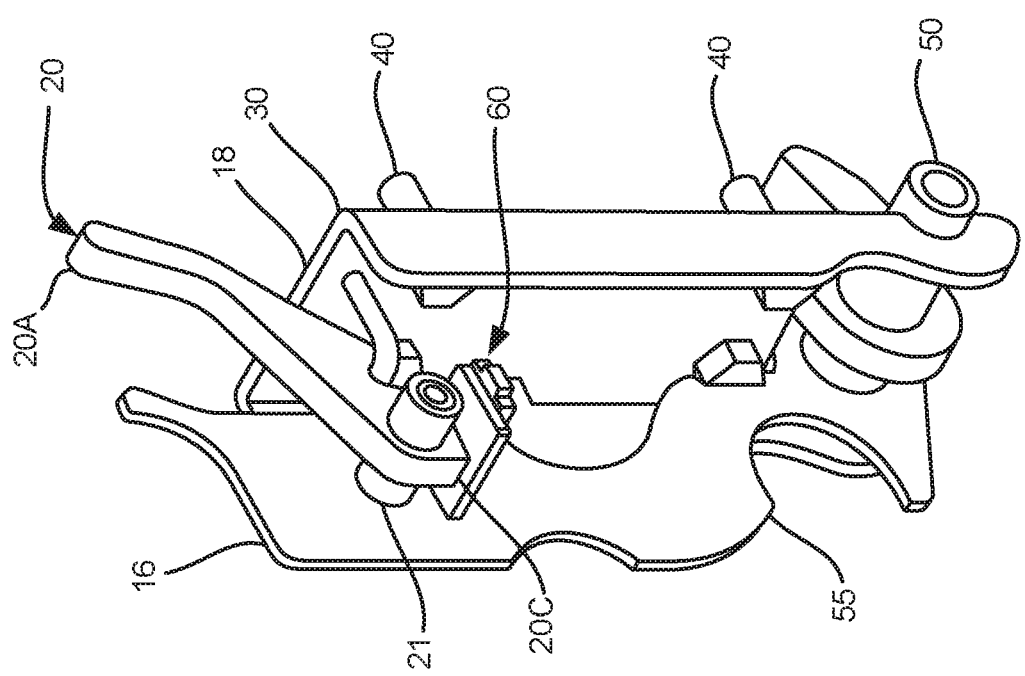
FIG. 6 is a perspective view of the latching system, according to one exemplary embodiment.

As is shown in FIG. 6, in certain exemplary embodiments the release member 20 is elongate, having first 20A and second 20C ends. In certain embodiments, the first end 20A is configured to provide a lever function for operation by the hand of a user and the second end 20C is configured to interact with the latching mechanism 60. In further embodiments, the release member 20 further comprises a release axle 21, about which the ends 20A, 20C of the release member can rotate. Various alternate configurations are possible.

Figure 5:
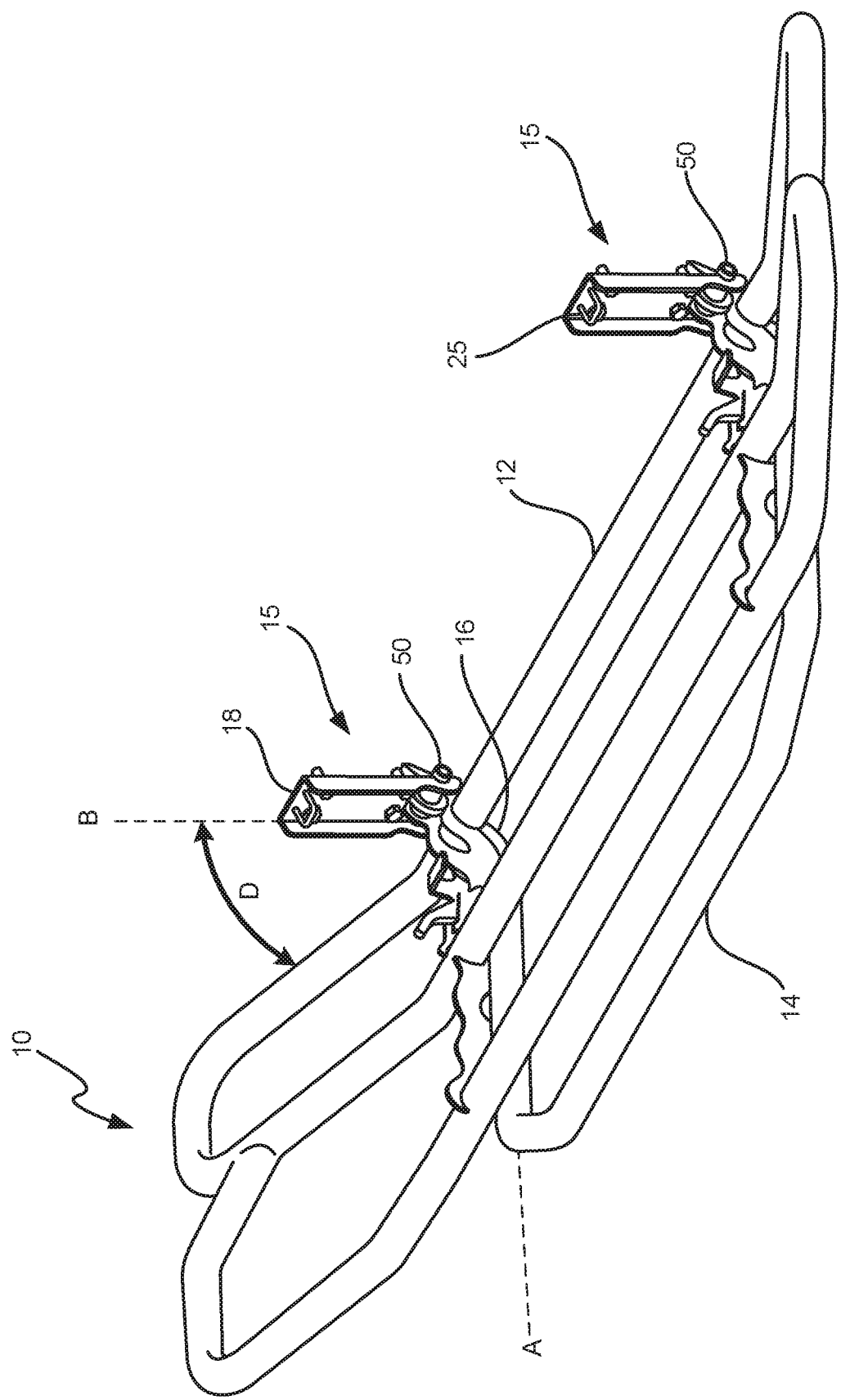
FIG. 5 is a perspective view of the quick release grill guard, according to the embodiment of FIG. 2 in the open position.
Figure 7:
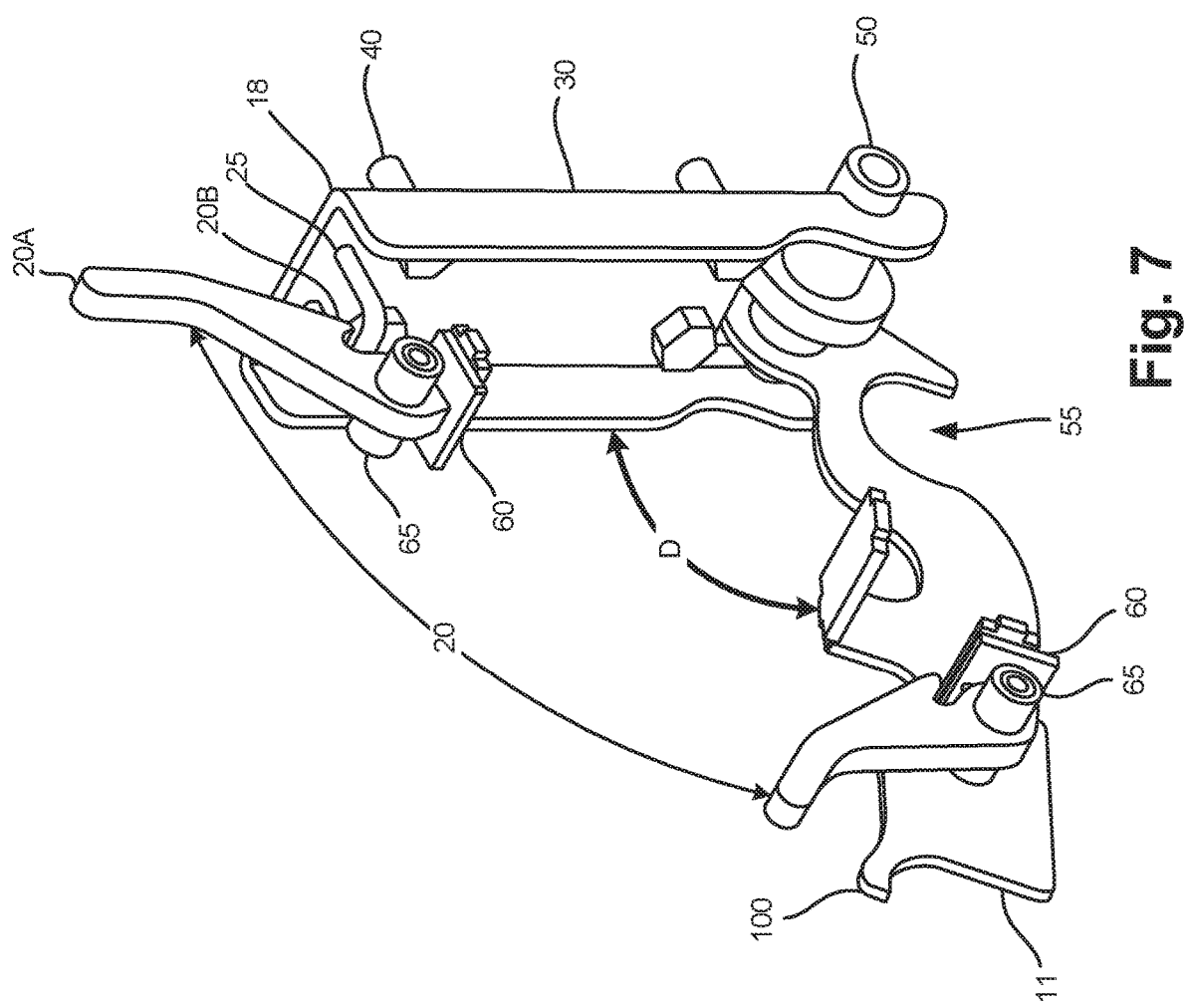
FIG. 7 is a perspective view of the latching system, according to the embodiment of FIG. 6 in the open position.
Figure 10:
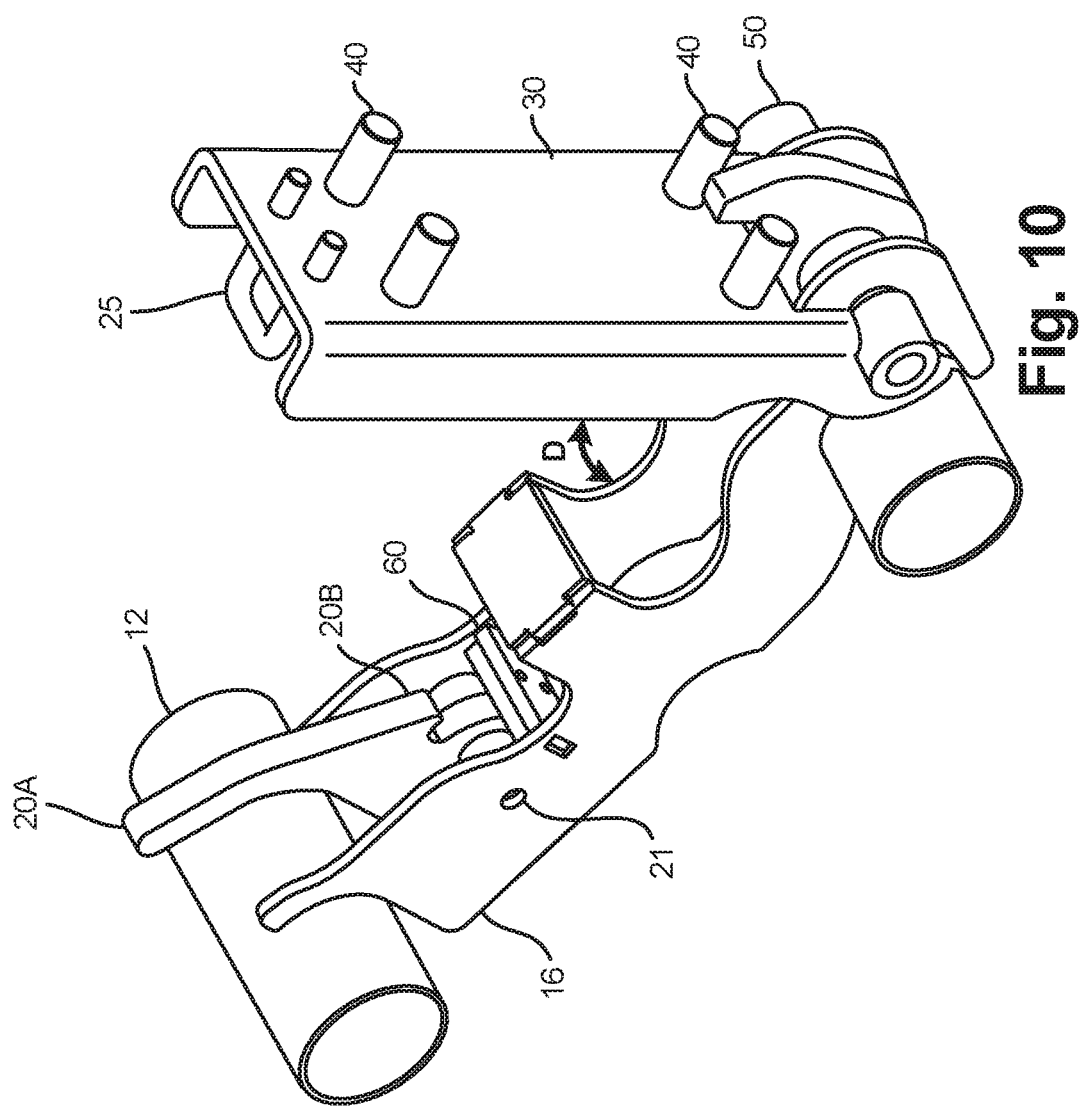
FIG. 10 is a reverse perspective view of the latching system in an open position, according to one exemplary embodiment.
Figure 11:
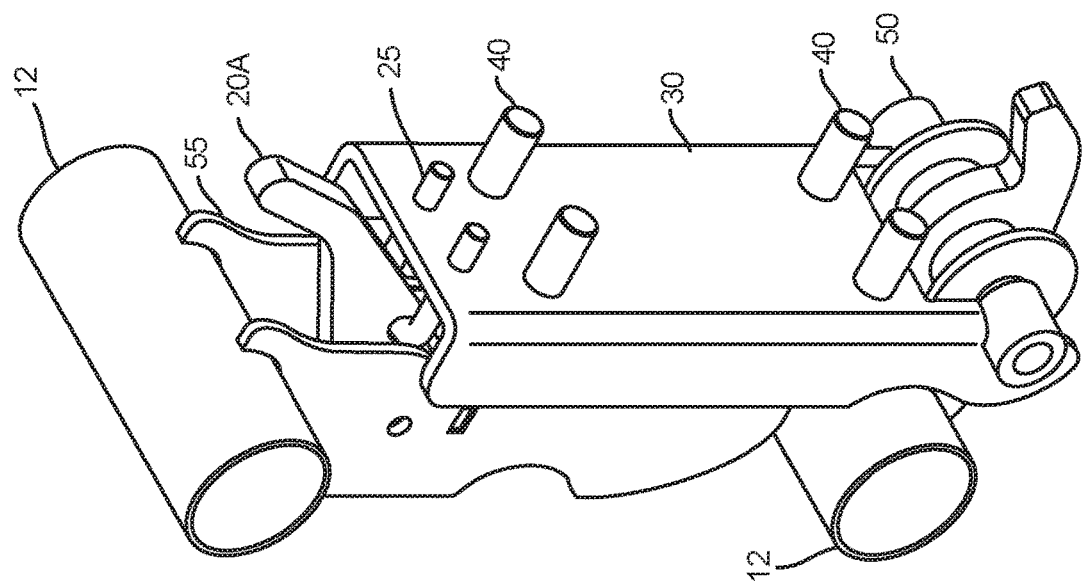
FIG. 11 is a reverse perspective view of the latching system of FIG. 10 in an closed position.

FIG. 7 depicts the movement of the grill guard coupling portion 16 relative to the vehicle coupling portion 18. In certain of these implementations, the release member 20 is operably coupled to the catch 25 so as to be mechanically released by movement of the operable portion, or first end 20A relative to the release axle 21. In certain implementations, the latch further comprises a hinge 50, so as to allow relative movement of the grill guard coupling portion 16 away from vehicle coupling portion 18 along the axis of the hinge 50, so as to move the grill guard (not shown) away from the plane of the grill, as shown by reference arrow D and substantially coaxial with the hinge 50 on a pivot, as is shown in FIGS. 5, 7 and 10.

Returning to the release member 20 and catch 25, in certain embodiments, the latch 20 further comprises a latching mechanism 60, which further comprises a release axle 21. In various embodiments, the release axle 21 establishes an axis for the release member 20 to move around relative to the catch 25, so as to disengage the coupling region of the release member 20B from the catch. In certain embodiments, the latching mechanism 60 further comprises a spring, such as a polyurethane spring, which is configured to apply pressure to the release member so as to urge it into an "upright" or otherwise "locked" position over the catch 25, thus being configured to keep the guard 10 in a locked position under normal operating conditions. In circumstances in which the user wishes to disengage the latch 60 from the catch 25, the user may move the release member 20 manually by way of the lever region, or first end 20A, as would be apparent to one of skill in the art.

Figure 8:
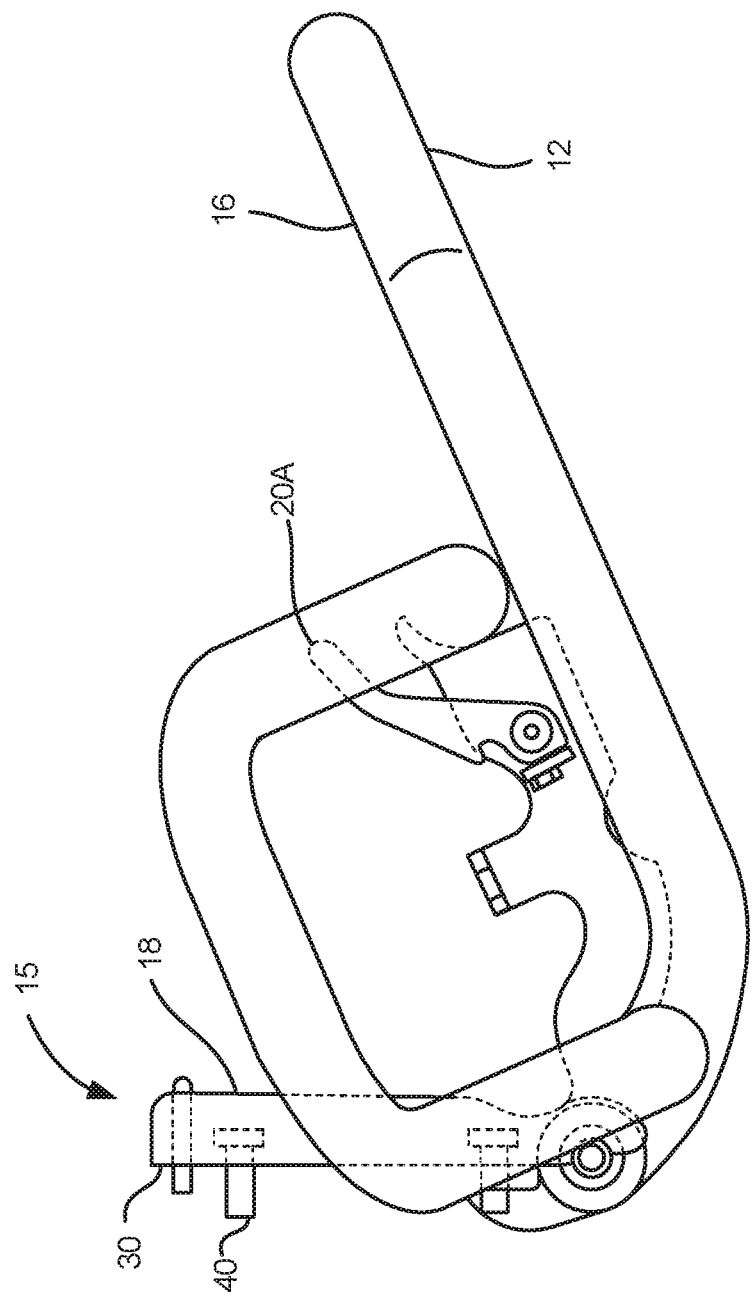
FIG. 8 is a cross-sectional view of an exemplary embodiment of the latching system.

FIG. 8 depicts a cross-sectional view of an exemplary embodiment of the latching system 15 comprising a grill guard coupling portion 16 and a vehicle coupling portion 18 and grill guard assembly 12 according to an exemplary embodiment of the quick release grill guard.

Figure 9:
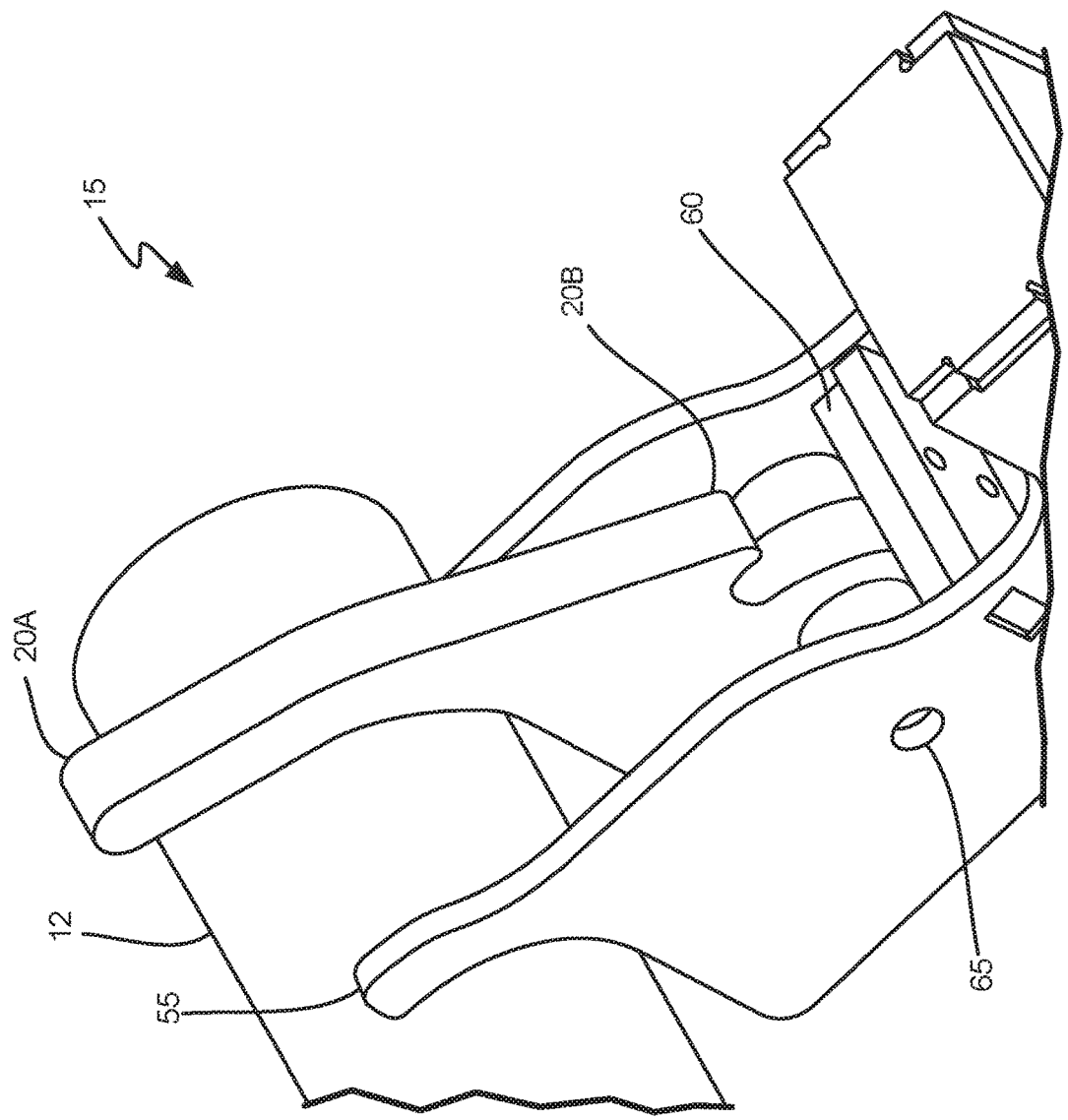
FIG. 9 is a close-up perspective view of the latching system showing one embodiment of the release member.
Figure 12:
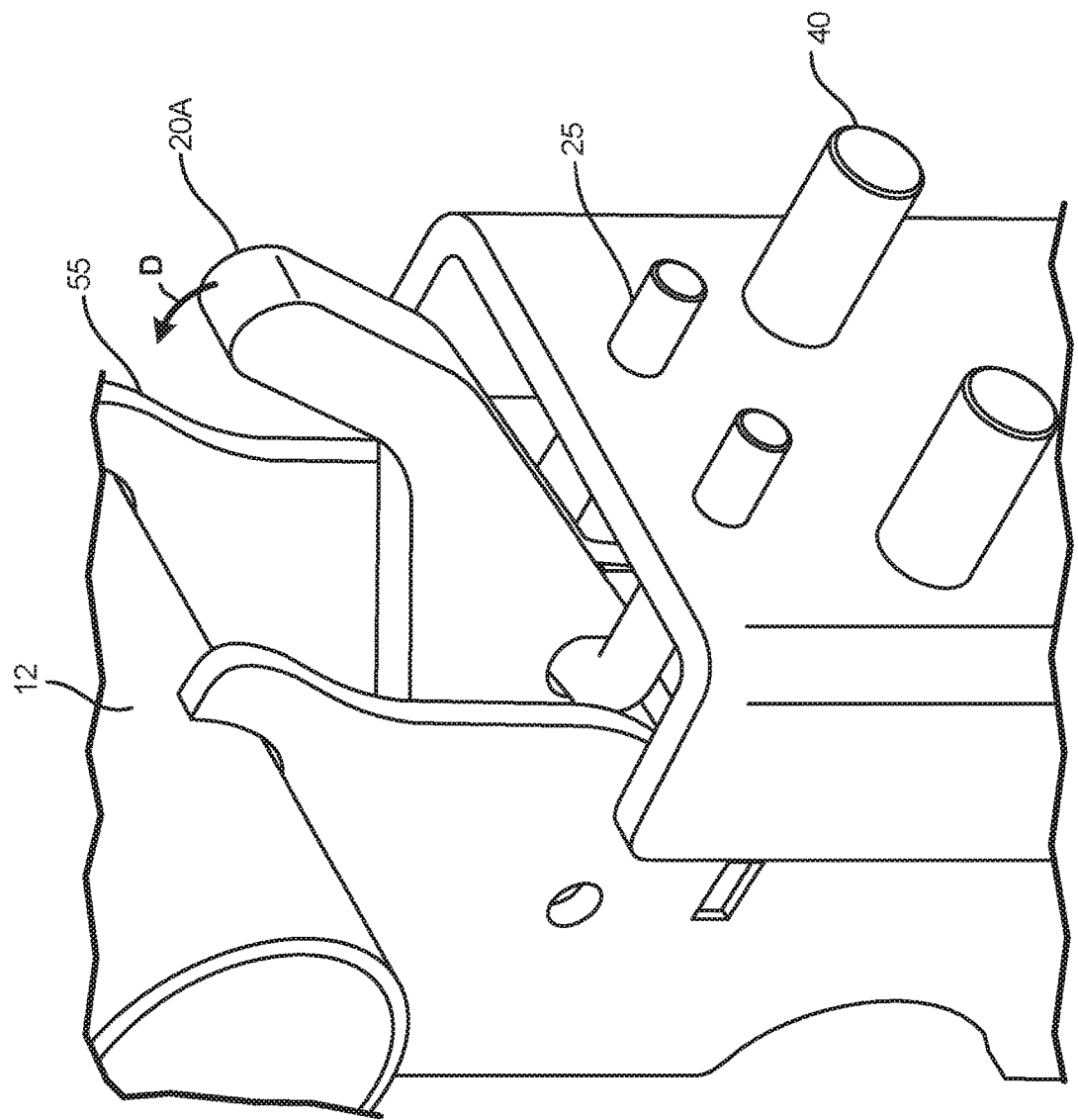
FIG. 12 is a close-up view of the release member depicted in FIG. 11.

FIG. 9 depicts a close-up perspective view of an exemplary embodiment of the latching system 15 showing an implementation of the coupling region of the release member 20B wherein the release member 20 has been disengaged from the catch (not shown). In these embodiments, the FIG. 12 depicts a close-up view of one embodiment of the system showing certain implementations of the coupling region of the release member 20B when the release member 20 is engaged to the catch 25. In certain implementations, and as best shown in FIG. 12, the release is triggered by manually moving the operable portion away from the catch 25 as shown by reference arrow D. In this way, in certain implementations, the system can be operated by hand.

Figure 13A:
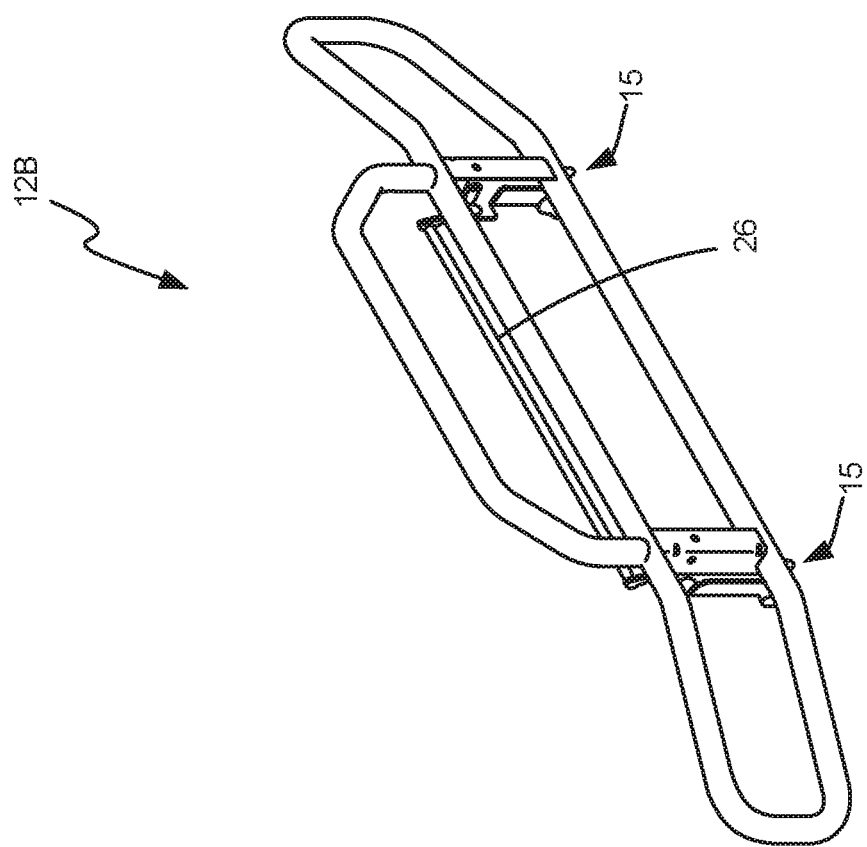
FIG. 13A is a perspective view of the quick release grill guard, according to a second exemplary embodiment having a double-looped grill.
Figure 13B:
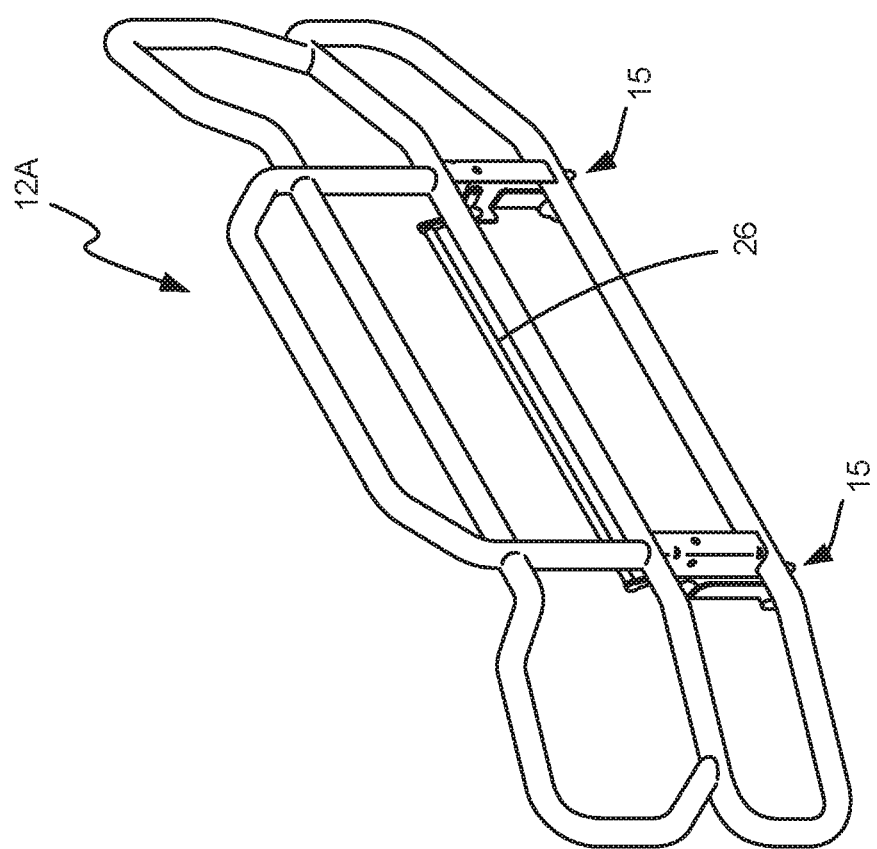
FIG. 13B is a perspective view of the quick release grill guard, according to an exemplary embodiment having a single-looped grill.
Figure 14B:
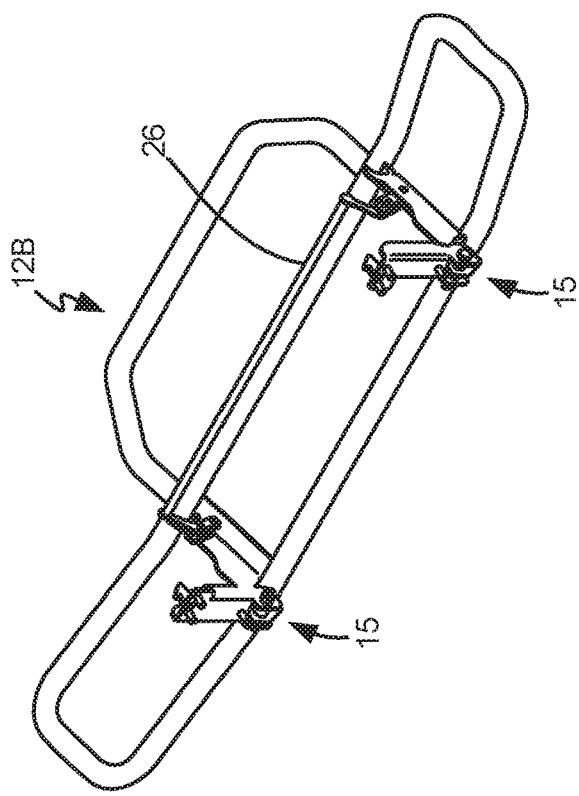
FIG. 14B is a perspective view of the quick release grill guard in the open position, according to the embodiment of FIG. 13B.
Figure 14A:
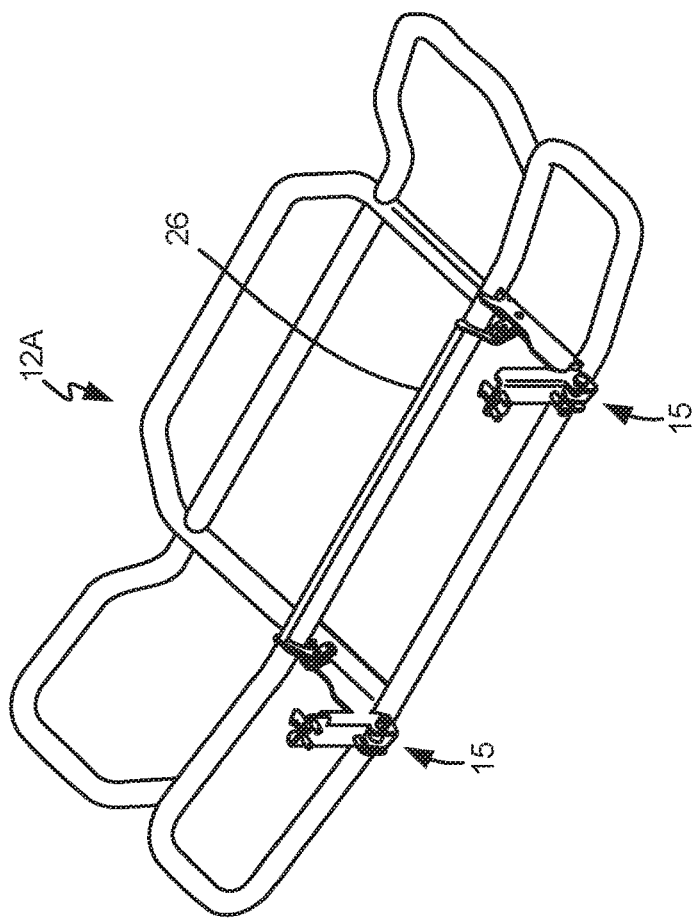
FIG. 14A is a perspective view of the quick release grill guard in the open position, according to the embodiment of FIG. 13A.

FIG. 13A-19 depict the quick release grill guard 10 according to an alternative embodiment which further comprises a single operation handle, or quick release bar 26. In these embodiments, a plurality of latching systems 15 are operated simultaneously by way of the quick release bar 26. FIGS. 13A-13B depict perspective views of exemplary embodiments of the quick release grill guard 10 comprising double-looped (shown at 12A in FIG. 13A) and single-looped (shown at 12B in FIG. 13B) guard configurations, which are among several grill guard configurations which are well-established in the art. FIGS. 14A-14B also depict views of the quick release grill guard 10 comprising the quick release bar 26, wherein the grill guard assembly 12 has been moved away from the vehicle (not shown).

Figure 15:
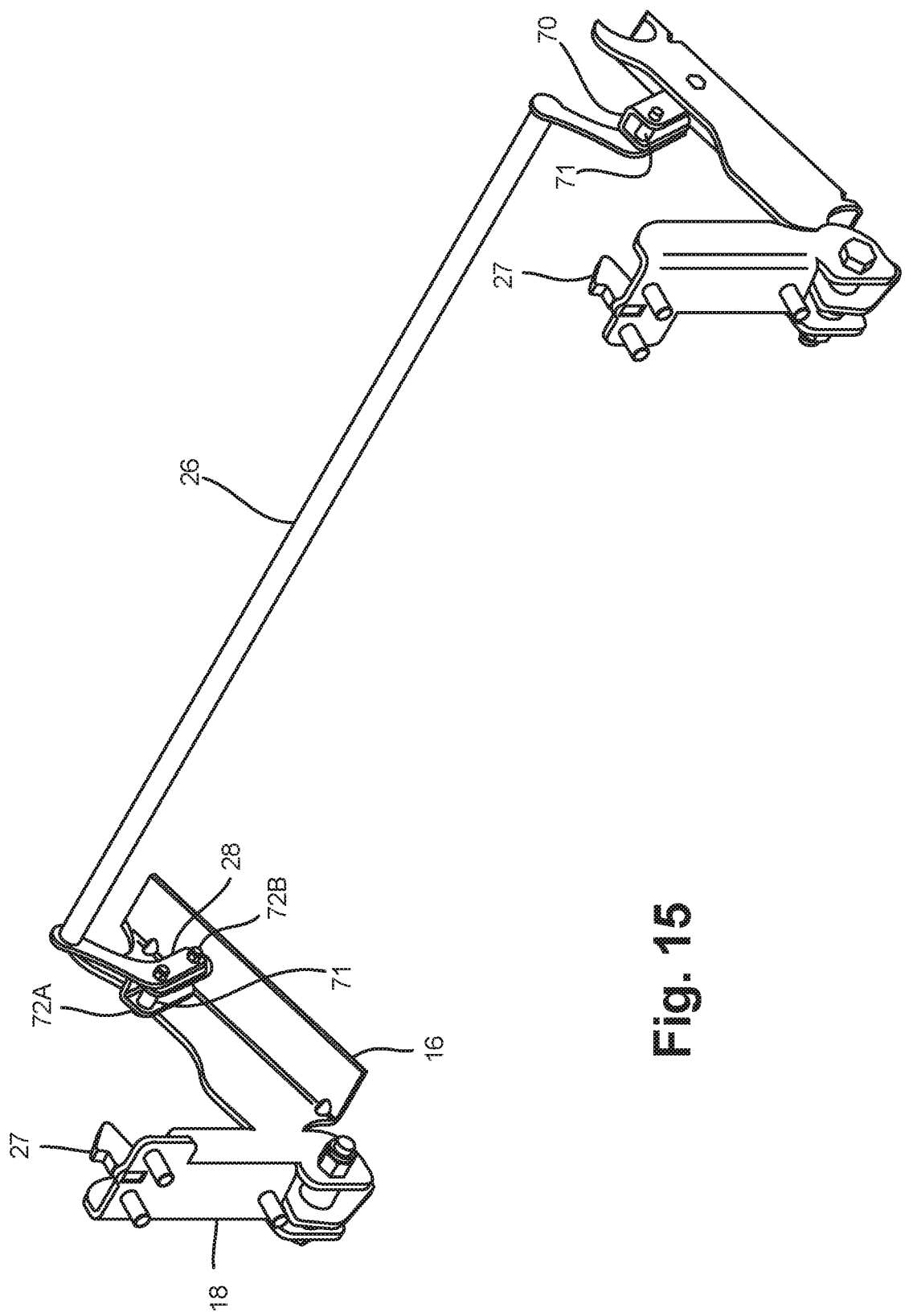
FIG. 15 is a perspective view of the quick release grill guard comprising a latching system further comprising a quick release bar.
Figure 16:
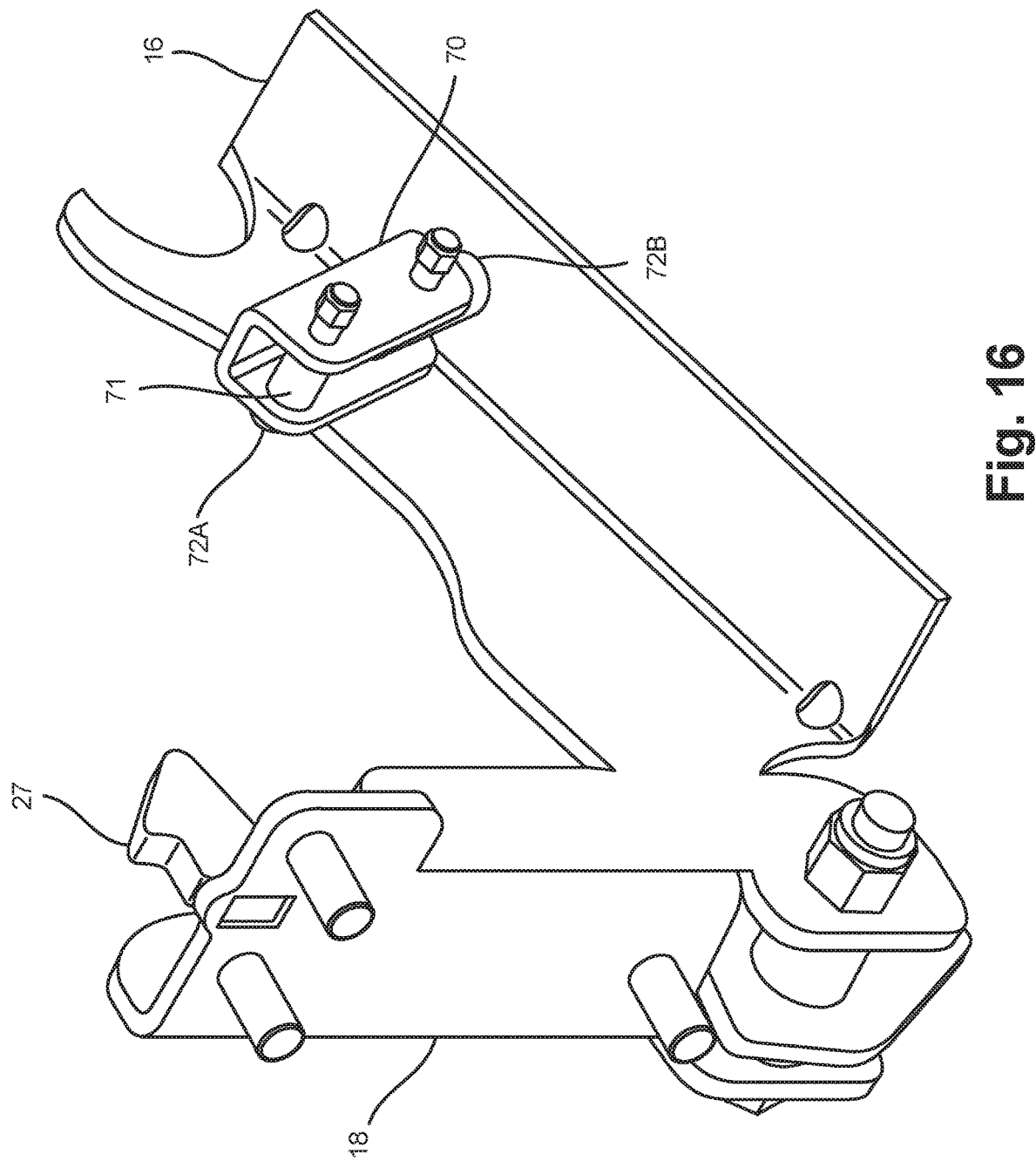
FIG. 16 is a close-up perspective view of the latching system of FIG. 15, in an open position.

FIG. 15 depicts a perspective view an exemplary embodiment of the quick release grill guard 10 further comprising the single operation handle or quick release bar 26. FIG. 16 depicts a close-up perspective view of the latching system 15 adapted for the quick release bar 26. In these embodiments, the quick release bar is operably coupled to a clasping member 70, which further comprises a latching pin 71. This coupling can be achieved, for example, by way of a plurality of fasteners 72A, 72B which attach the clasping member 70 to the quick release bar 26 by way of a coupling region 28.

In various embodiments, the coupling region 28 is substantially planar, and may take the form of an "L," or other acute or obtuse angle, would be apparent to one of skill in the art. In certain embodiments, the clasping member 70 is formed by extruded metal and takes the shape of an inverted U-beam.

In various embodiments, the latching pin 71 is a bushing, such as a nylon bushing, which is seated in the clasping member by way of an axle (shown at 73 in FIG. 17) which is connected to the first fastener 72A. In certain embodiments, a second fastener 72B can also comprise a hinge (shown as 75 in FIGS. 18A-18B) which allows movement of the quick release bar relative to the grill guard coupling portion 16 so as to actuate the release of the clasping member 70 from the clasped member 27, which is capable of locking with the latching pin 71 by way of a spring (best shown in FIG. 17 at 74). FIG. 17 depicts an opposite perspective view of an exemplary embodiment of the quick release grill guard 10 depicted in FIG. 16, and showing the spring 74.

Figure 18B:
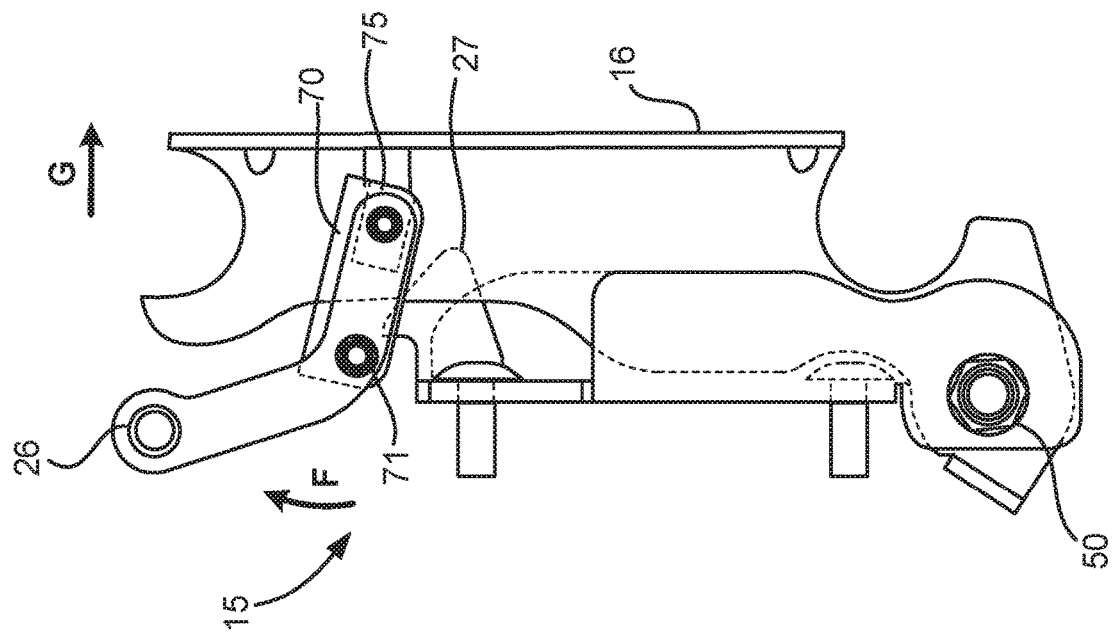
FIG. 18B is a cross-sectional view of an exemplary embodiment of the quick release grill guard wherein the quick release bar is in the open position.
Figure 18A:
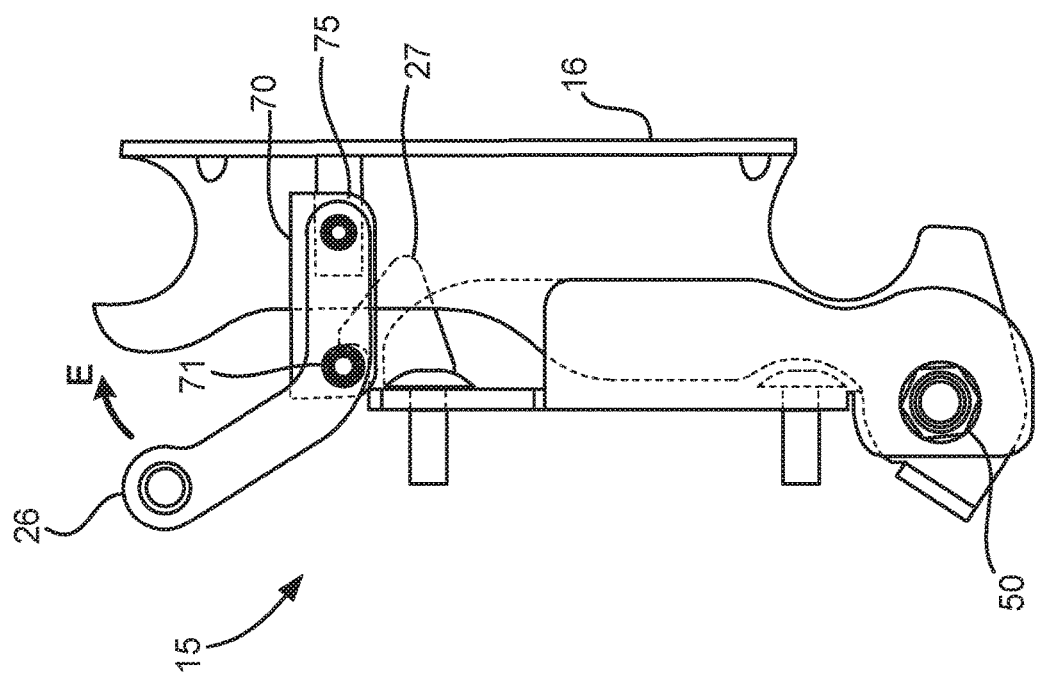
FIG. 18A is a cross-sectional view of an exemplary embodiment of the quick release grill guard wherein the quick release bar is in the closed, or locked position.
Figure 19:
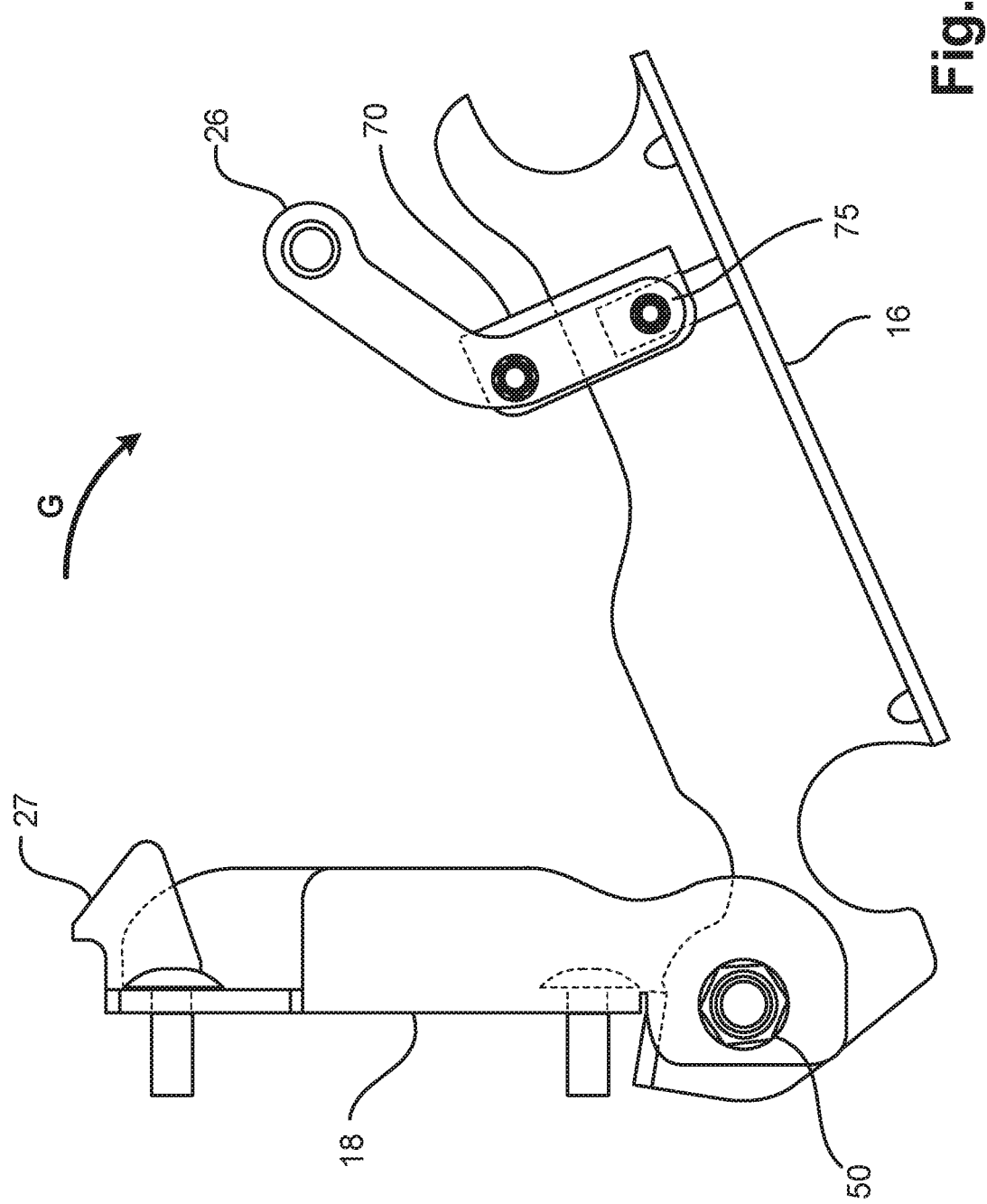
FIG. 19 is a cross-sectional view of an exemplary embodiment of the quick release grill guard wherein the quick release bar is in the open position and the grill guard coupling portion has been pivoted away from the grill.

FIGS. 18A-19 depict cross-sectional views of exemplary embodiments of the latching system 15 comprising the quick release bar 26 and showing the actuation of the clasping member 70. In these embodiments, the latching pin 71 is normally nested in the clasped member 27 so as to lock the grill guard in alignment with the grill, as is described elsewhere herein. When the user wishes to pivot the grill guard away from the face of the grill, the user may raise the quick release bar 26, as depicted by the reference arrow E. In so doing, the latching pin is disengaged from the clasped member 27 (as shown by reference arrow F), so as to free the grill guard coupling portion 16 to pivot about the hinge 50 (and in the direction of reference arrow G).

Although the disclosure has been described with reference to preferred embodiments, persons skilled in the art will recognize that changes may be made in form and detail without departing from the spirit and scope of the disclosed apparatus, systems and methods.

What is claimed is:

1. A quick-release grill guard, comprising:
   a. a vehicle coupling portion comprising a vehicle axis;
   b. a grill guard coupling portion comprising a grill axis; and
   c. a latch constructed and arranged to be capable of a locked state and a freely rotatable state
   wherein the grill guard coupling portion is rotatable with respect to the vehicle coupling portion.

2. The quick-release grill guard of claim 1, further comprising a release member.

3. The quick-release grill guard of claim 2, wherein the release member comprises a lever.

4. The quick-release grill guard of claim 2, wherein the release member is in operable communication with a latching mechanism.

5. The grill guard latch of claim 1, wherein the vehicle axis and grill axis are maintained in substantially parallel orientation when the latch is in the locked state.

6. The grill guard latch of claim 1, wherein the vehicle axis and grill axis are freely rotatable relative to one another when the latch is in the freely rotatable state.

7. The grill guard latch of claim 1, comprising a hinge.

8. A pivoting system for a grill guard, comprising:
   a. a hinge; and
   b. a latch,
   wherein the hinge and latch are constructed and arranged to facilitate selective rotation of an entirety of the grill guard.

9. The pivoting system of claim 8, further comprising a coupling portion.

10. The pivoting system of claim 9, further comprising a release member.

11. The pivoting system of claim 10, wherein the release member comprises a release axle.

12. The pivoting system of claim 11, further comprising a catch.

13. The pivoting system of claim 8, further comprising a bracket.

14. A grill guard pivoting system, comprising:
   a. a latch;
   b. a clasped member; and
   c. a clasping member constructed and arranged to be in releasably locking communication with the clasped member,
   wherein the latch is operably coupled to the clasping member and is configured to control the release of the grill guard.

15. The pivoting system of claim 14, further comprising a latching pin.

16. The pivoting system of claim 14, configured to lock the grill guard in a position substantially vertical position during normal operating conditions.

17. The pivoting system of claim 14, comprising at least one hinge configured to allow free rotation of the grill guard upon operation of the clasping member.

* * * * *

(12) EX PARTE REEXAMINATION CERTIFICATE (219th)
Ex Parte Reexamination Ordered under 35 U.S.C. 257

United States Patent
Drever

(10) Number: US 10,906,489 C1
(45) Certificate Issued: Mar. 27, 2023

(54) QUICK RELEASE GRILL GUARD AND ASSOCIATED SYSTEMS AND METHODS

(71) Applicant: Holt Sales & Service, Inc., Des Moines, IA (US)

(72) Inventor: Jeremy Drever, Ankeny, IA (US)

(73) Assignee: HOLT SALES & SERVICE, INC., Des Moines, IA (US)

Supplemental Examination Request:
No. 96/000,400, May 24, 2022

Reexamination Certificate for:
Patent No.: 10,906,489
Issued: Feb. 2, 2021
Appl. No.: 16/166,326
Filed: Oct. 22, 2018

Related U.S. Application Data

(63) Continuation of application No. 15/419,377, filed on Jan. 30, 2017, now Pat. No. 10,106,114, which is a continuation of application No. 14/825,344, filed on Aug. 13, 2015, now Pat. No. 9,555,757, which is a continuation of application No. 14/249,974, filed on Apr. 10, 2014, now Pat. No. 9,114,771.

(60) Provisional application No. 61/810,598, filed on Apr. 10, 2013.

(51) Int. Cl.
| | |
|---|---|
| *B60R 19/52* | (2006.01) |
| *E05C 3/12* | (2006.01) |
| *E05C 3/14* | (2006.01) |
| *E05C 9/08* | (2006.01) |
| *E05D 11/10* | (2006.01) |

(52) U.S. Cl.
CPC ............... *B60R 19/52* (2013.01); *E05C 3/12* (2013.01); *E05C 3/14* (2013.01); *E05C 9/08* (2013.01); *E05D 11/1007* (2013.01); *B60R 2019/522* (2013.01); *E05Y 2900/50* (2013.01); *Y10T 292/082* (2015.04)

(58) Field of Classification Search
CPC ..... E05C 9/08; E05C 3/12; E05C 3/14; E05D 11/1007; B60R 19/52; B60R 19/522; E05Y 2900/50; Y10T 292/082
See application file for complete search history.

(56) References Cited

To view the complete listing of prior art documents cited during the supplemental examination proceeding and the resulting reexamination proceeding for Control Number 96/000,400, please refer to the USPTO's Patent Electronic System.

*Primary Examiner* — Terrence R Till

(57) ABSTRACT

The disclosed apparatus, systems and methods relate to a quick release grill guard further comprising at least one latching system configured for the quick release and pivot of the grill guard away from the vehicle grill face. In certain embodiments, the quick release grill guard further comprises a grill guard coupling portion, a vehicle coupling portion, a latching portion a hinge, a quick release bar; and a clasping member. In certain embodiments, the grill guard coupling portion is capable of being freely pivoted relative to the hinge by actuation of the clasping member by way of the quick release bar. In exemplary embodiments, the quick release bar is in operable communication with multiple latching systems so as to release the grill guard in a plurality of locations simultaneously.

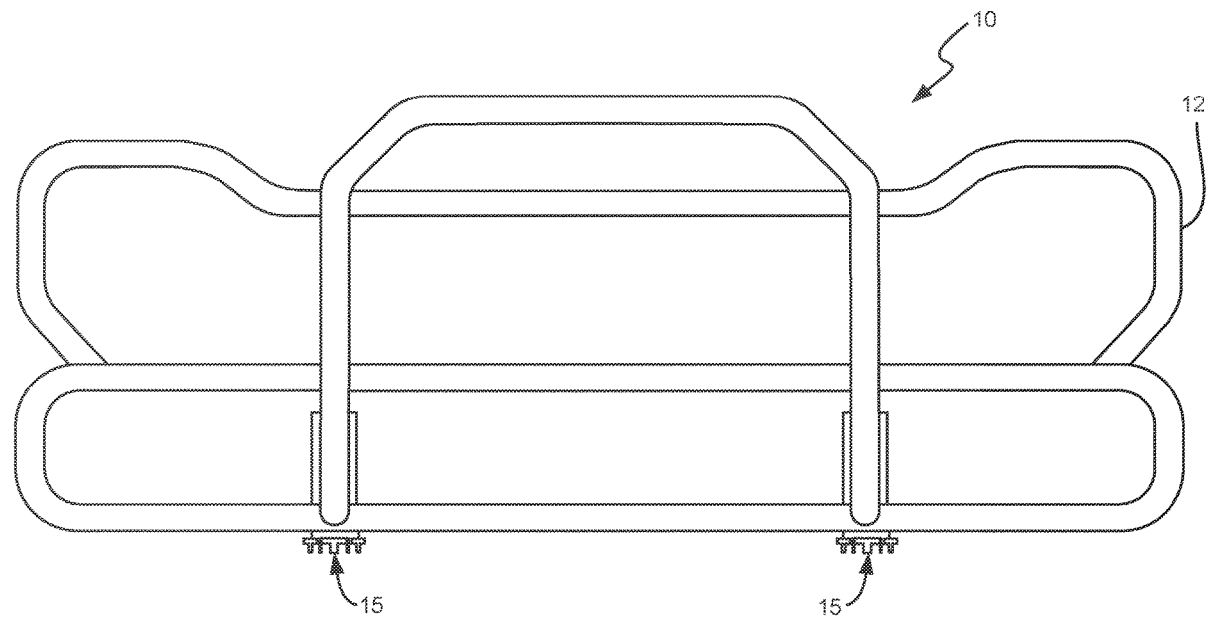

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-4 and 9-11 are cancelled.

Claims 1, 5-8, 12-15 and 17 are determined to be patentable as amended.

Claim 16, dependent on an amended claim, is determined to be patentable.

1. A quick-release grill guard, comprising:
   a. a vehicle coupling portion comprising a vehicle axis;
   b. a grill guard coupling portion comprising a grill axis; and
   c. a *first* latch *and a second latch, each* constructed and arranged to be capable of a locked state and a freely rotatable state, *each latch comprising:*
      (i) *a clasping member disposed on the grill guard coupling portion; and*
      (ii) *a clasped member disposed on the vehicle coupling portion, wherein when the clasping member is engaged with the clasped member when each latch is in the locked state; and*
   d. *a release bar connecting the first latch and the second latch,*
   wherein the grill guard coupling portion is rotatable with respect to the vehicle coupling portion.

5. The *quick-release* grill guard [latch] of claim 1, wherein the vehicle axis and grill axis are maintained in substantially parallel orientation when [the] *each* latch is in the locked state.

6. The *quick-release* grill guard [latch] of claim 1, wherein the vehicle axis and grill axis are freely rotatable relative to one another when [the] *each* latch is in the freely rotatable state.

7. The *quick-release* grill guard [latch] of claim 1, *further* comprising a hinge *connecting the vehicle coupling portion and the grill guard coupling portion.*

8. A pivoting system for a grill guard, comprising:
   a. a *first* hinge *and a second hinge*; [and]
   b. a *first* latch *system and a second latch system, each latch system comprising:*
      (i) *a clasping member comprising a pin;*
      (ii) *a clasped member configured for engagement with the pin; and*
      (iii) *a vehicle coupling portion configured to attach the latch system to a vehicle, where the clasped member is operatively engaged with the vehicle coupling portion; and*
   c. *a release bar connecting the first latch system and the second latch system,*
   wherein the *first* hinge and *first* latch *system and the second hinge and second latch system* are constructed and arranged to facilitate selective rotation of an entirety of the grill guard *upon actuation of the release bar.*

12. The pivoting system of claim [11]*8*, [further comprising] *wherein the clasped member is* a catch.

13. The pivoting system of claim 8, [further comprising] *wherein the vehicle coupling portion comprises* a bracket.

14. A grill guard pivoting system, comprising:
    a. a *first* latch [; b.]*comprising:*
       i. a *first* clasped member *operatively engaged with a first vehicle coupling portion*; [and
       c.] ii. a *first* clasping member *operatively engaged with a first grill guard coupling portion, and* constructed and arranged to be in releasably locking communication with the *first* clasped member;
    b. *a second latch comprising:*
       i. *a second clasped member operatively engaged with a second vehicle coupling portion;*
       ii. *a second clasping member operatively engaged with a second grill guard coupling portion, and constructed and arranged to be in releasably locking communication with the second clasped member,*
    wherein the *first* latch [is] *and the second latch are* operably coupled to [the clasping member] *a quick release bar* and [is] *are* configured to control the release of the grill guard *upon actuation of the quick release bar.*

15. The pivoting system of claim 14, *wherein the first clasping member and second clasping member each* further [comprising] *comprise* a latching pin.

17. The pivoting system of claim 14, comprising at least one hinge configured to allow free rotation of the grill guard upon [operation of the clasping member] *actuation of the quick release bar.*

\* \* \* \* \*